United States Patent
Yoshimura

(10) Patent No.: US 10,721,378 B2
(45) Date of Patent: Jul. 21, 2020

(54) IMAGE MANAGEMENT SYSTEM AND UNMANNED FLYING BODY

(71) Applicant: SONY INTERACTIVE ENTERTAINMENT INC., Tokyo (JP)

(72) Inventor: Masanobu Yoshimura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 1 day.

(21) Appl. No.: 16/318,261

(22) PCT Filed: Jul. 29, 2016

(86) PCT No.: PCT/JP2016/072389
§ 371 (c)(1),
(2) Date: Jan. 16, 2019

(87) PCT Pub. No.: WO2018/020673
PCT Pub. Date: Feb. 1, 2018

(65) Prior Publication Data
US 2020/0053256 A1    Feb. 13, 2020

(51) Int. Cl.
*B64C 39/02* (2006.01)
*H04N 7/18* (2006.01)
(Continued)

(52) U.S. Cl.
CPC .......... *H04N 5/225* (2013.01); *B64C 39/024* (2013.01); *G05D 1/0094* (2013.01); *H04N 7/181* (2013.01); *B64C 2201/127* (2013.01)

(58) Field of Classification Search
None
See application file for complete search history.

(56) References Cited

U.S. PATENT DOCUMENTS 9,367,067 B2 *   6/2016   Gilmore ................ G05D 1/101

FOREIGN PATENT DOCUMENTS

JP    2004-343434 A   12/2004
JP    2015-207149 A   11/2015
(Continued)

OTHER PUBLICATIONS

International Search Report and Written Opinion dated Sep. 27, 2016, from International Application No. PCT/JP2016/072389, 10 sheets.
(Continued)

*Primary Examiner* — Mark T Monk
(74) *Attorney, Agent, or Firm* — Katten Muchin Rosenman LLP

(57) ABSTRACT

In an image management system 100, an unmanned flying body 1 acquires a camera image during the flight of the unmanned moving body, an image accumulating server 30 records the camera image, and a reproduction terminal apparatus 40 reproduces the camera image. If a predetermined subject is determined included in the camera image, then one of the acquisition processing, the recording processing, and the reproduction processing to be executed on an camera image is restricted. Further, if an image-taking prohibited area is determined included in an image-taking range of a camera, one of the acquisition processing, the recording processing, and the reproduction processing to be executed on the camera image is restricted.

6 Claims, 8 Drawing Sheets

(51) Int. Cl.
*G05D 1/00* (2006.01)
*H04N 5/225* (2006.01)

(56) References Cited

FOREIGN PATENT DOCUMENTS

JP 2016-119628 A 6/2016
WO 2015/182034 A1 12/2015

OTHER PUBLICATIONS

International Preliminary Report on Patentability completed Jul. 31, 2018, from International Application No. PCT/JP2016/072389, 12 sheets.

* cited by examiner (a)

(b)

F I G . 2
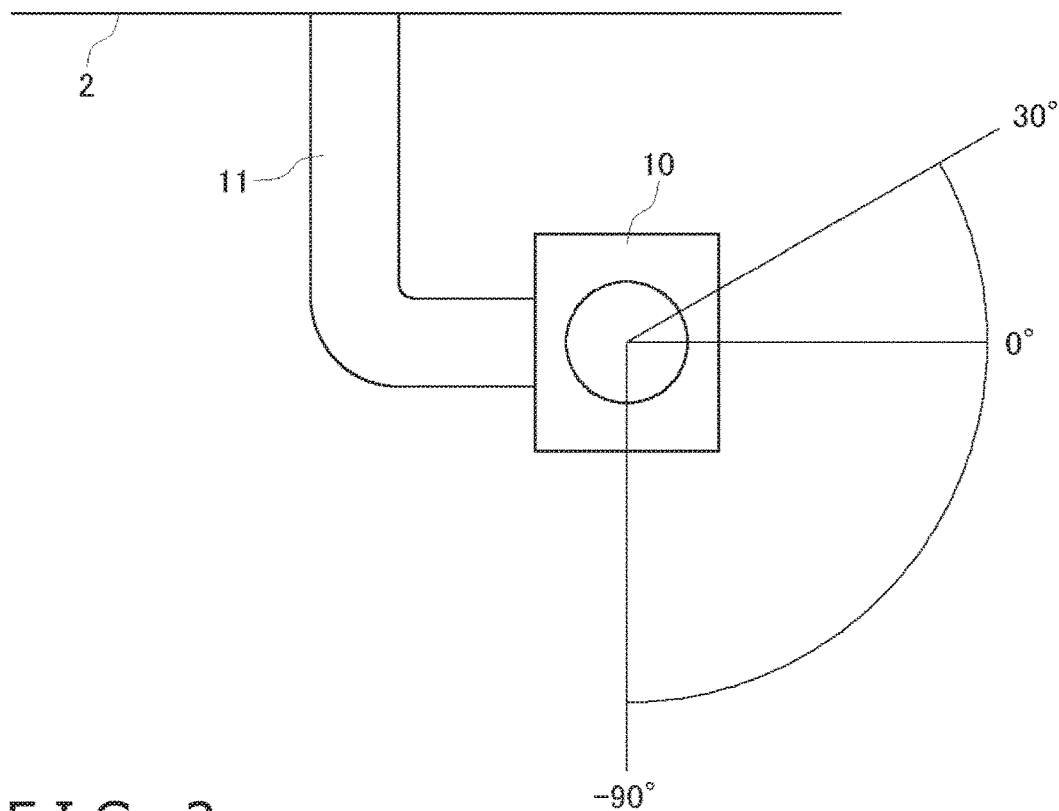
F I G . 3
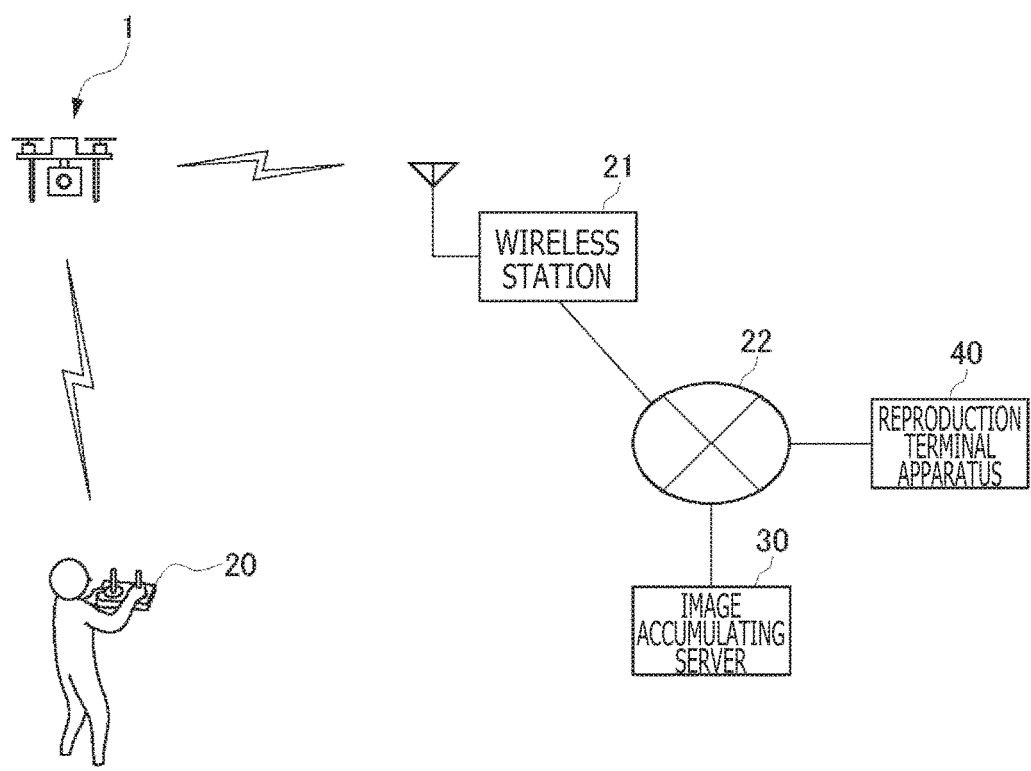

(a)

(b)

IMAGE MANAGEMENT SYSTEM AND UNMANNED FLYING BODY

TECHNICAL FIELD

The present invention relates to a technology of managing camera images acquired by an unmanned moving body such as an unmanned flying body.

BACKGROUND ART

These days, unmanned flying bodies such as a multicopter having a camera are gaining popularity. For unmanned flying bodies, a no-fly zone is set in order to control the airframes of the unmanned flying bodies such that the unmanned flying bodies are disabled to get in the no-fly zone; currently, however, no restriction related with image taking with these unmanned flying bodies is stipulated.

SUMMARY

Technical Problems

Since an unmanned flying body having a camera can move to any place, such an unmanned flying body can take images of various subjects regardless whether or not a user operating the airframe is malicious. Recently, it is general practice to publish taken camera images on the Internet, thereby making it necessary to build technologies of managing camera images in consideration of protecting privacy and security.

Further, the development of unmanned moving bodies such as unmanned moving robots having wheels and legs and unmanned driving vehicles is currently under way in a variety of fields. Since one of the development aims of these unmanned moving bodies is the image-taking processing in a given place, the necessity of properly managing the camera images taken in a variety of situations is increasing.

Therefore, the present invention addresses the above-identified and other problems associated with related-art methods and apparatuses and solves the addressed problems by providing a technology of properly managing camera images taken with unmanned moving bodies.

Solution to Problems

In carrying out the invention and according to one mode thereof, there is provided an image management system for managing a camera image acquired by an unmanned moving body. The image management system includes a drive control block configured to move the unmanned moving body by controlling a drive source of the unmanned moving body, an image acquisition block configured to acquire a camera image while the unmanned moving body is moving, an image recording block configured to record the camera image acquired by the image acquisition block, a reproduction processing block configured to reproduce the camera image recorded by the image recording block, and a restriction block configured to restrict any one of the acquisition of the camera image by the image acquisition block, the recording of the camera image by the image recording block, and the reproduction of the camera image by the reproduction processing block.

In carrying out the invention and according to another mode thereof, there is provided an unmanned flying body. The unmanned flying body includes a drive control block configured to control a drive source to fly an airframe, a camera, an image acquisition block configured to acquire a camera image during the flight of the airframe, an image recording block configured to record the camera image acquired by the image acquisition block, and a restriction block configured to restrict any one of the acquisition of the camera image by the image acquisition block and the recording of the camera image by the image recording block on the basis of a camera attitude and a flight state of the airframe.

It should be noted that the conversions of any combinations of the components described above and the expressions of the present invention between a method, apparatus, system, computer program, computer-readable recording medium, and data structure are also effective as modes of the present invention.

BRIEF DESCRIPTION OF DRAWINGS

FIG. 2 is a diagram for explaining elevation angles of a camera.

FIG. 3 is a diagram illustrating a configuration of an image management system practiced as one embodiment.

DESCRIPTION OF EMBODIMENTS

With embodiments, an image management system for managing camera images obtained with an unmanned flying body is described. It should be noted that an unmanned flying body is one of unmanned moving bodies driven by a user through remote operation or autonomous control and therefore the image management system of the embodiments may manage camera images taken with an unmanned moving robot or an unmanned driving vehicle.

Figure 1:
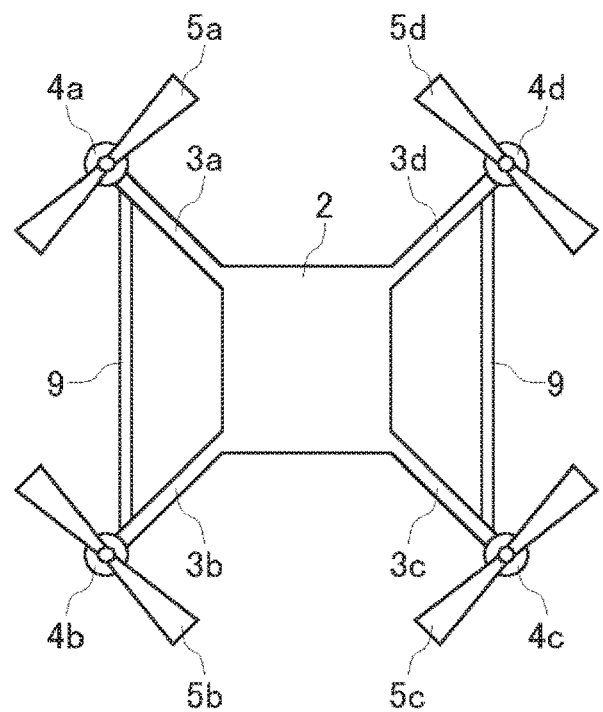
FIG. 1(a) is a top view of an unmanned flying body and FIG. 1(b) is a side view of the unmanned flying body.
Figure 1:
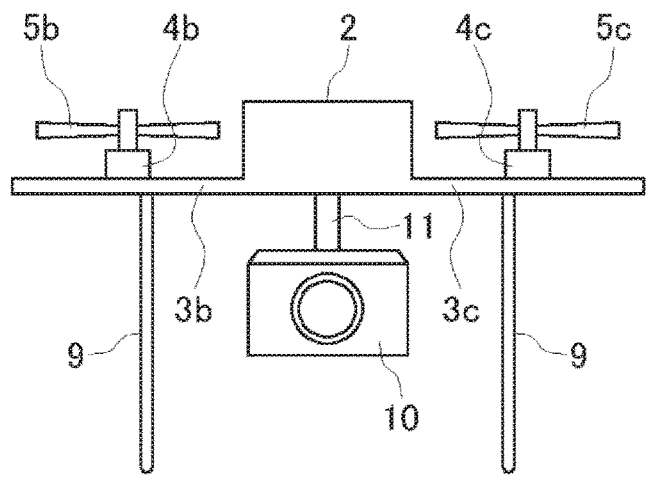

FIG. 1(a) is a top view of an unmanned flying body 1 in the embodiment. The unmanned flying body 1 is a multicopter having two or more rotors (propellers) and manipulated for flight with a remote controller (hereafter referred to as "a remote control") called propo. The unmanned flying body 1 of the embodiment is a quadcopter having four rotors; however, it is also practicable for the unmanned flying body 1 to be hexacopter having six rotors, an octocopter having eight rotor, or other copters having other number of rotors. Further, the unmanned flying body 1 of the embodiment is a drone of rotor-blade type; however, it is also practicable for the unmanned flying body 1 to be a drone of fixed-blade type.

The unmanned flying body 1 includes a housing 2 on which a control unit and sensors of various types are mounted. From the housing 2, a first arm 3a, a second arm 3b, a third arm 3c, and a fourth arm 3d (hereafter may be generically referred to as "arm 3" unless otherwise noted) are radially extended in the horizontal direction.

At the end position of each arm 3, a rotor and an electric motor, a drive source of the rotor, are arranged.

In the embodiment, the first arm 3a has a first motor 4a, thereby driving a first rotor 5a. The second arm 3b has a second motor 4b, thereby driving a second rotor 5b. The third arm 3c has a third motor 4c, thereby driving a third rotor 5c. The fourth arm 3d has a fourth motor 4d, thereby driving a fourth rotor 5d. In what follows, unless otherwise noted, the motors may be generically referred to as "motor 4" and the rotors may be generically referred to as "rotor 5."

FIG. 1(b) illustrates a side view of the unmanned flying body 1. The airframe has a pair of legs 9 between which a camera 10 and a gimbal 11 are arranged. The gimbal 11 is an apparatus that sets an elevation angle of the camera 10 so as to stabilize the camera attitude in flight, the camera 10 being fixed to the airframe through the gimbal 11.

FIG. 2 is a diagram for describing the elevation angle of the camera 10, the airframe being viewed from the left side. The gimbal 11 sets the elevation angle of the camera 10 in accordance with a command given by a user. The elevation angle of the camera 10 is set to within elevation angle movable range of 30 degrees upward and −90 degrees downward with the horizontal direction being the reference (zero degree). The user sets the tilt of the camera 10 within the elevation angle movable range by manipulating an elevation angle change dial (a gimbal dial) of the camera arranged on the remote control.

In taking an image in the front direction of the airframe, the user sets the elevation angle of the camera 10 to zero degree. In taking an image in the horizontal upward direction, the user sets the elevation angle of the camera 10 to zero to 30 degrees. In taking an image in the horizontal downward direction, the user sets the elevation angle of the camera 10 to zero to −90 degrees. Thus, the gimbal 11 has a function of setting the elevation angle of the camera 10.

FIG. 3 illustrates a configuration of an image management system 100 of the embodiment. The user flies the unmanned flying body 1 by use of a remote control 20. Upon turning on the image-taking function of the camera 10 by the user through the remote control 20, the camera 10 of the unmanned flying body 1 is activated. The camera 10 includes an image sensor for photo-electrically converting an optical image of a subject included in an image-taking range and an image engine for generating an image file by processing the electrical signals of red, blue, and green colors outputted from the image sensor. The camera 10 generates a moving image file but may generate a still image file. In what follows, the image that is generated by the camera 10 is referred to as "a camera image."

The unmanned flying body 1 wirelessly sends a camera image to an image accumulating server 30. The image accumulating server 30 is connected to a network 22 such as the Internet; a camera image sent from the unmanned flying body 1 is received by a wireless station 21 that is a wireless receiving station and then transmitted to the image accumulating server 30 through the network 22. The image accumulating server 30 receives the camera image and records the received camera image.

A reproduction terminal apparatus 40, connected to the network 22, reproduces a camera image recorded to the image accumulating server 30. The user flying unmanned flying body 1 may reproduce a camera image through the reproduction terminal apparatus 40 or another user may reproduce a camera image through the reproduction terminal apparatus 40. The reproduction terminal apparatus 40 may be a personal computer or a tablet terminal of mobile type. The reproduction terminal apparatus 40 may be realtime distributed with the camera image taken through the unmanned flying body 1 from the image accumulating server 30.

As described above, in the image management system 100, the unmanned flying body 1 acquires a camera image, image accumulating server 30 records the camera image, and the reproduction terminal apparatus 40 reproduces the camera image. It should be noted that the unmanned flying body 1 may have the camera image recording function so as to record a camera image to a storage apparatus such as a secure digital (SD) memory card. The user connects a camera data port arranged the unmanned flying body 1 to the reproduction terminal apparatus 40 with a universal serial bus (USB) cable, upon which the reproduction terminal apparatus 40 downloads and reproduces the recorded camera image.

Figure 4:
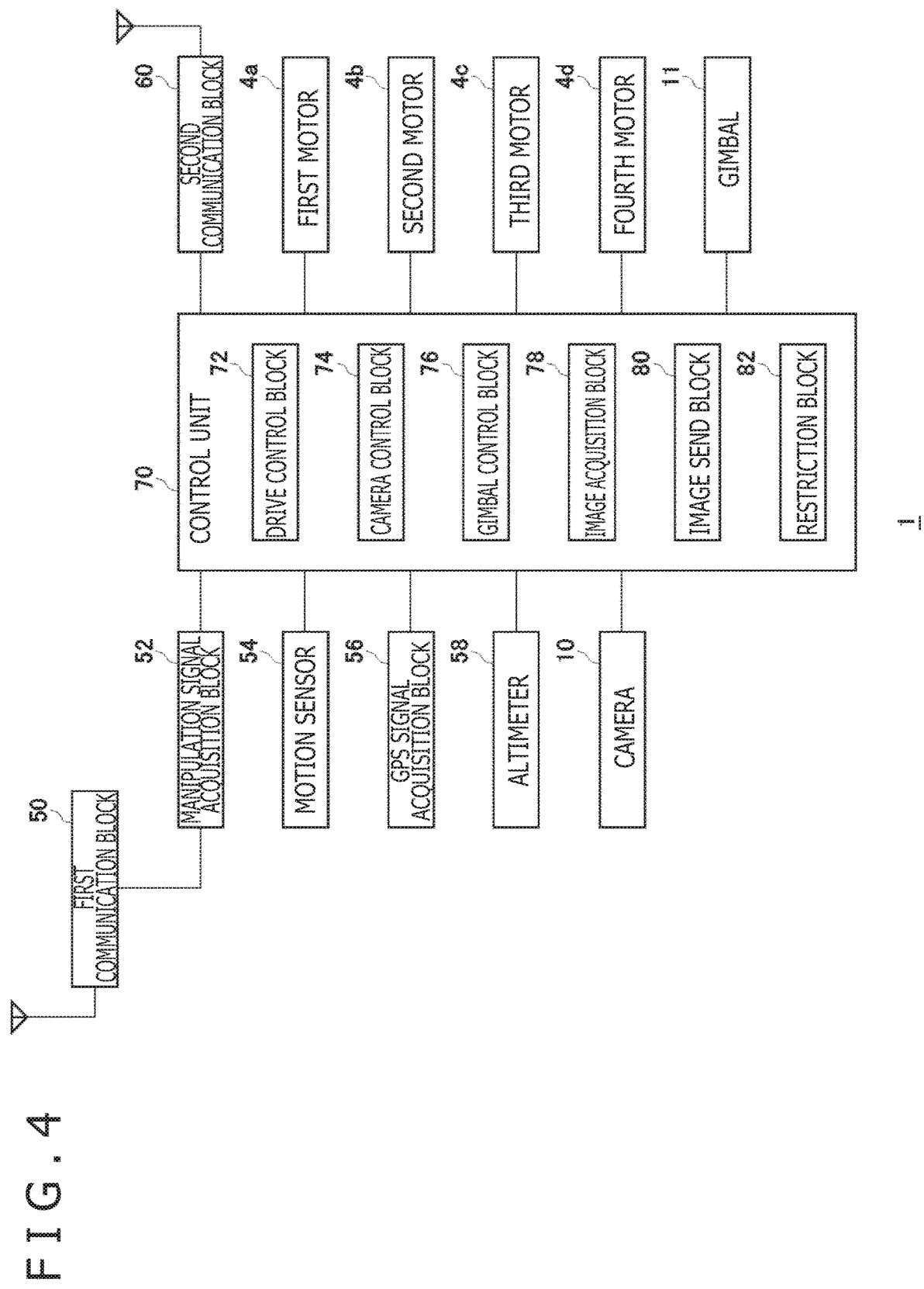
FIG. 4 is a diagram illustrating functional blocks of the unmanned flying body.

FIG. 4 illustrates functional blocks of the unmanned flying body 1. The unmanned flying body 1 includes a first communication block 50, a manipulation signal acquisition block 52, a motion sensor 54, a global positioning system (GPS) signal acquisition block 56, an altimeter 58, a control unit 70, and a second communication block 60, in addition to the motors 4, the camera 10, and the gimbal 11. The control unit 70 is mounted in the housing 2 and includes a drive control block 72, a camera control block 74, a gimbal control block 76, an image acquisition block 78, an image send block 80, and a restriction block 82.

In FIG. 4, the elements of the control unit 70 described as functional blocks for executing a variety of processing may each be configured by a central processing unit (CPU), a memory, and other large scale integration (LSI) in a hardware approach; in a software approach, these functions can be realized by programs loaded in the memory. Therefore, it is understood by those skilled in the art that these functions can be realized in a variety of forms, namely, by only hardware, only software, or combinations thereof and therefore not restricted thereto.

The first communication block 50 receives a manipulation signal sent from the remote control 20 of the user. The manipulation signal acquisition block 52 acquires the manipulation signal received by the first communication block 50. Manipulation signals sent from the remote control include flight command signals for directing flight states such as a forward/backward command signal, an upward/downward command signal, and a direction change command signal, and camera control signals for setting the elevation angle (the pitch) of the camera 10 and directing the recording of a taken image (a camera image) of the camera 10. The camera image recording commands include a moving image recording command and a still image recording command.

The drive control block 72 controls the drive source of the unmanned flying body 1 on the basis of a flight command signal acquired by the manipulation signal acquisition block 52, thereby moving the unmanned flying body 1. In the embodiment, the drive control block 72 is a motor control block for controlling the rotation of two or more motors 4 that are drive sources and determines the amounts of currents to be applied to the motors 4 in accordance with the flight command signal, thereby flying the airframe by supplying the currents from a battery not depicted.

The motion sensor 54 includes a three-axis angular speed sensor and a three-axis acceleration sensor. The drive control block 72 computes the flight speed and direction of the airframe from the results of the detection by the motion sensor 54. Further, the drive control block 72 may compute the flight speed and direction of the airframe by use of the results of the detection by a three-axis geomagnetic sensor. Since the unmanned flying body 1 in flight is influenced by the wind, the drive control block 72 adjusts, from time to time, the amount of the current to be applied on the basis of the detection result of each sensor so as to keep the airframe in the state in accordance with a flight command signal. In addition, the drive control block 72 computes the attitude of the airframe from the results of the detection by the motion sensor 54 so as to control the rotation of the motor 4, thereby maintaining the attitude of the airframe in the horizontal direction.

The gimbal control block 76 sets an elevation angle of the camera 10 on the basis of an elevation angle setting command signal acquired by the manipulation signal acquisition block 52. Further, the gimbal control block 76 computes the attribute of the airframe from the results of the detection by the motion sensor 54 so as to drivingly control the gimbal 11, thereby stabilizing the elevation angle attitude relative to the horizontal direction of the camera 10. It should be noted that the gimbal control block 76 may control the stability of the gimbal 11 on the basis of the airframe attitude computed and provided by the drive control block 72.

The GPS signal acquisition block 56 acquires a GPS signal and the altimeter 58 measures the altitude of the airframe. The drive control block 72 obtains the latitude and the longitude from the acquired GPS signal and obtains the altitude of the airframe from the altimeter 58 so as to identify the current airframe location.

The camera control block 74 executes the processing of recording a camera image on the basis of a recording command signal acquired by the manipulation signal acquisition block 52. A camera image recording command may be sent from the remote control 20 during the flight of the unmanned flying body 1; it is also practicable for this command to be sent before the flight of the unmanned flying body 1. It should be noted that, in the embodiment, the camera control block 74 controls the image acquisition block 78 and the image send block 80 to record a camera image, thereby sending the camera image to the image accumulating server 30.

As described above, the camera 10 includes the image sensor for outputting an analog electrical signal of an optical image and the image engine for generating a digital camera image from the output of the image sensor. The image engine executes analog/digital (A/D) conversion on the gain-adjusted electrical signal, generates a camera image from the digital signal by YUV format or the like, and writes the generated camera image to a frame memory. When the recording of a camera image is directed by the user, the image acquisition block 78 acquires the camera image written to the frame memory and executes image compression processing as required. It should be noted that the image compression processing may be executed by the camera 10 for the image acquisition block 78 to acquire the compressed camera image.

As described above, the image acquisition block 78 acquires the camera image generated by the camera 10 during the movement of the unmanned flying body 1. The image acquisition block 78 adds metadata related with the camera 10 at the time of image acquisition. This metadata includes at least the positional information and image-taking direction of the camera 10. The positional information is identified by the latitude, longitude, and altitude providing the airframe location at the time of image acquisition and the image-taking direction identified by the front direction of the airframe and the elevation angle of the camera 10. The airframe location and the airframe front direction are computed by the drive control block 72. The metadata may be added to each camera image by the camera 10.

The image send block 80 executes the send processing on a camera image acquired by the image acquisition block 78. The image send block 80 wirelessly sends the camera image from the second communication block 60 to the image accumulating server 30 (refer to FIG. 3). The sent camera image is transmitted to the image accumulating server 30 via the wireless station 21 and the network 22. It should be noted that the second communication block 60 and the first communication block 50 may be configured as the same communication module.

Figure 5:
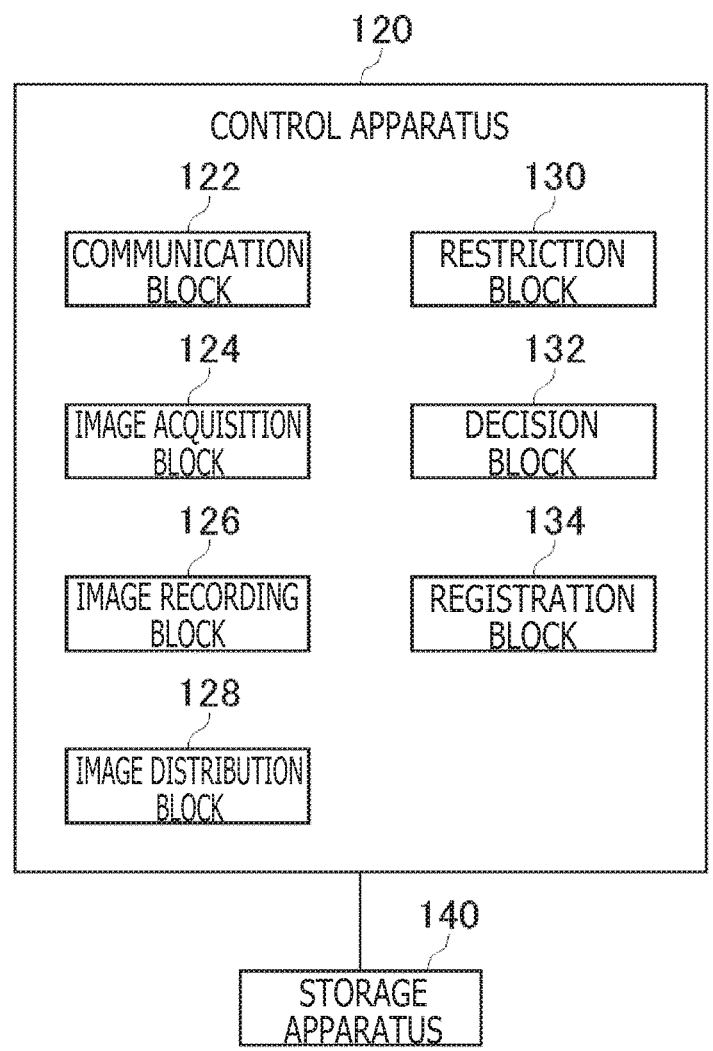
FIG. 5 is a diagram illustrating functional blocks of an image accumulating server.

FIG. 5 illustrates functional blocks of the image accumulating server 30. The image accumulating server 30 includes a control apparatus 120 and a storage apparatus 140. The control apparatus 120 includes a communication block 122, an image acquisition block 124, an image recording block 126, an image distribution block 128, a restriction block 130, a decision block 132, and a registration block 134. The communication block 122, connected to the network 22, executes communication with other communication devices connected to the network 22, such as the wireless station 21 and the reproduction terminal apparatus 40 here.

In FIG. 5, the elements of the control apparatus 120 that are described as functional blocks for executing a variety of processing can be configured by a CPU, a memory, and other LSIs in hardware approach; in software approach, these elements are configured by programs loaded in the memory. Therefore, it is understood by those skilled in the art that these functional blocks can be realized by only hardware, only software, a combination thereof, or in a variety of other forms and there is no restriction thereto.

The image acquisition block 124 acquires a camera image sent from the unmanned flying body 1 and the image recording block 126 records the camera image acquired by the image acquisition block 124 to the storage apparatus 140. The image distribution block 128 distributes camera image recorded to the storage apparatus 140 to the reproduction terminal apparatus 40 that has requested for a reproduction request. For example, if the image accumulating server 30 allows the live distribution of a camera image acquired by the unmanned flying body 1, then the image distribution block 128 distributes a camera image sent realtime by the unmanned flying body 1 to the reproduction terminal apparatus 40 in a realtime streaming manner.

Figure 6:
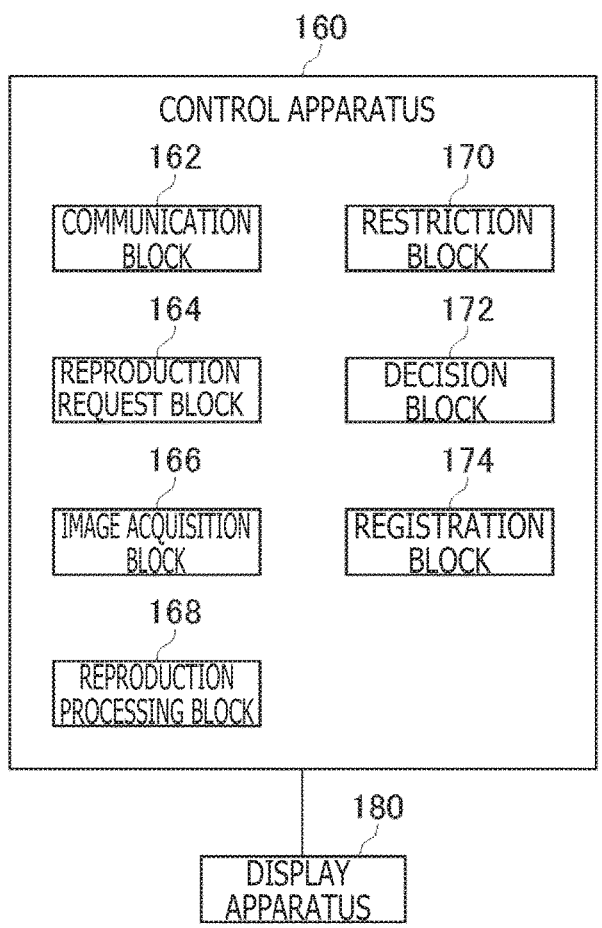
FIG. 6 is a diagram illustrating functional blocks of a reproduction terminal apparatus.

FIG. 6 illustrates functional blocks of the reproduction terminal apparatus 40. The reproduction terminal apparatus 40 includes a control apparatus 160 and a display apparatus 180. The control apparatus 160 includes a communication block 162, a reproduction request block 164, an image acquisition block 166, a reproduction processing block 168, a restriction block 170, a decision block 172, and a registration block 174. The communication block 162, connected to the network 22, executes communication with other communication devices connected to the network 22, such as the image accumulating server 30 here.

In FIG. 6, the elements of the control apparatus 160 that are described as functional blocks for executing a variety of processing can be configured by a CPU, a memory, and other LSIs in hardware approach; in software approach, these elements are configured by programs loaded in the memory. Therefore, it is understood by those skilled in the art that these functional blocks can be realized by only hardware, only software, a combination thereof, or in a variety of other forms and there is no restriction thereto.

The reproduction request block 164 sends a camera image reproduction request to the image accumulating server 30 on the basis of a reproduction command from the user of the reproduction terminal apparatus 40. When the image accumulating server 30 accepts the reproduction request and sends a recorded camera image, the image acquisition block 166 acquires the camera image sent from the image accumulating server 30 and the reproduction processing block 168 reproduces the acquired camera image on the display apparatus 180. Consequently, the user of the reproduction terminal apparatus 40 is able to view the camera image. As described above, the user of the reproduction terminal apparatus 40 may be the user who flies the unmanned flying body 1 or another user.

Thus, in the image management system 100, a mechanism in which the unmanned flying body 1 acquires a camera image, the image accumulating server 30 records the acquired image, and the reproduction terminal apparatus 40 reproduces the recorded image is built. By viewing a camera moving image taken by the unmanned flying body 1 in flight, the user can get the feeling as if the user were strolling in the air.

Here, since the unmanned flying body 1 can move to a given place, it is possible that a camera image not suitable for reproduction is taken. It is not desired for an improper camera image to be recorded without change or reproduced without change; for example, a camera image taken in a flight state suspicious of spy photography or a camera image in which an improper subject is included need be restricted in any one of the acquisition processing, recording processing, and reproduction processing on such a camera image.

Referring to FIG. 4 through FIG. 6, the unmanned flying body 1 includes the restriction block 82, the image accumulating server 30 includes the restriction block 130, and the reproduction terminal apparatus 40 includes the restriction block 170. These restriction blocks individually restrict the acquisition processing, the recording processing, and the reproduction processing to be executed on camera images. The following describes management modes in which the processing operations related with camera images are restricted.

<Management Mode 1>

In a management mode 1, in order to prevent spy photography, the restriction block 82 of the unmanned flying body 1 restricts the camera image acquisition by the image acquisition block 78 on the basis of a moving state, a flight state here, of the unmanned flying body 1.

Figure 7:
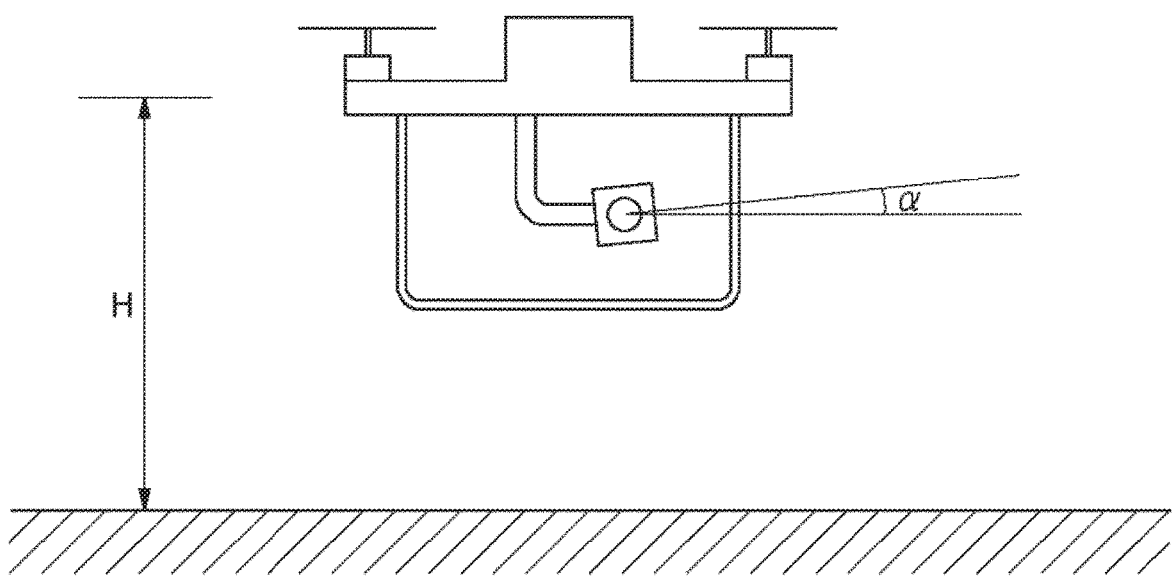
FIG. 7 is a diagram illustrating a flight state of the unmanned flying body.

FIG. 7 illustrates a manner in which the unmanned flying body 1 is flying at altitude H with the elevation angle of the camera 10 being α. If, at this moment, altitude H is equal to or lower than 0.3 m and elevation angle α is equal to or higher than a positive predetermined value, then, in order to acquire a camera image upward from a low position, the camera 10 may take an image inside the skirt of a female depending upon situations. Even if there is no intention for the user to take spy photography, setting elevation angle α of the camera 10 upward from the horizontal direction in flight a predetermined altitude or below may resultantly acquire an improper camera image, so that it is desired to restrict the camera image acquisition processing in such a flight state.

Therefore, if the airframe altitude obtained by the drive control block 72 is equal to or lower than a predetermined altitude (0.3 m), the restriction block 82 restricts the acquisition of a camera image by the image acquisition block 78 on the basis of the elevation angle of the camera 10. If, as depicted in FIG. 2, the elevation angle of the camera 10 can be set within a range of zero degree to 30 degrees upward from the horizontal direction and the elevation angle of the camera 10 is equal to or higher than a predetermined angle (15 degrees, for example) during the flight the predetermined altitude or below, the restriction block 82 restricts the acquisition of a camera image by the image acquisition block 78.

The restriction block 82 may disable the acquisition of a camera image by the image acquisition block 78 as a restriction mode of camera image acquisition processing. This disallows the image acquisition block 78 to read any camera images written by the camera 10 to a frame memory, thereby preventing the acquisition itself of any camera images that may improper.

It should be noted that, as another restriction mode of the camera image acquisition processing, the restriction block 82 may forcibly restrict the elevation angle of the camera 10 to a value smaller than the predetermined angle (15 degrees) during the flight below a predetermined altitude. During the flight the predetermined altitude or below, the restriction block 82 makes the gimbal control block 76 disable the elevation angle setting equal to or higher than the predetermined angle. Therefore, if the preset elevation angle is equal to or higher than the predetermined angle during the flight below the predetermined altitude (0.3 m), the restriction block 82 makes the gimbal control block 76 forcibly change the elevation angle to an angle (10 degrees, for example) smaller than the predetermined angle. If the airframe altitude gets higher than the predetermined altitude, then the restriction block 82 controls the gimbal control block 76 so as to restore the original preset elevation angle.

As described above, in the management mode 1, the acquisition of a camera image is restricted by the restriction block 82 on the basis of camera attitude and airframe flight state. In the management mode 1, the acquisition of a camera image is restricted on the basis of camera attitude and flight state regardless of an actual subject, thereby avoiding the acquisition of an improper camera image.

<Management Mode 2>

In a management mode 2, if an improper subject is included in a camera image acquired by the unmanned flying body 1, then the restriction block 130 of the image accumulating server 30 restricts the recording of camera image by the image recording block 126 and/or the restriction block 170 or the reproduction terminal apparatus 40 restricts the reproduction of the camera image by the reproduction processing block 168.

As described above, the camera image acquired by the unmanned flying body 1 is sent to the image accumulating server 30 through the network 22 to be acquired by the image acquisition bloc 124. At this moment, the decision block 132 determines whether or not a predetermined subject is included in the acquired camera image.

In many cases, a house and an apartment are enclosed in the ground parts thereof with a fence or the like to prevent peeping; however, in the upper parts, there is no fear of peeping at least from the ground, so that no measures are taken against spy photography. However, since the unmanned flying body 1 flies at altitudes higher than the ground level without problem, allowing the unmanned flying body 1 to fly without restriction may cause privacy and security problems. Therefore, if a predetermined subject is included in a camera image, the image management system 100 restricts the processing related with such a camera image.

Figure 8:
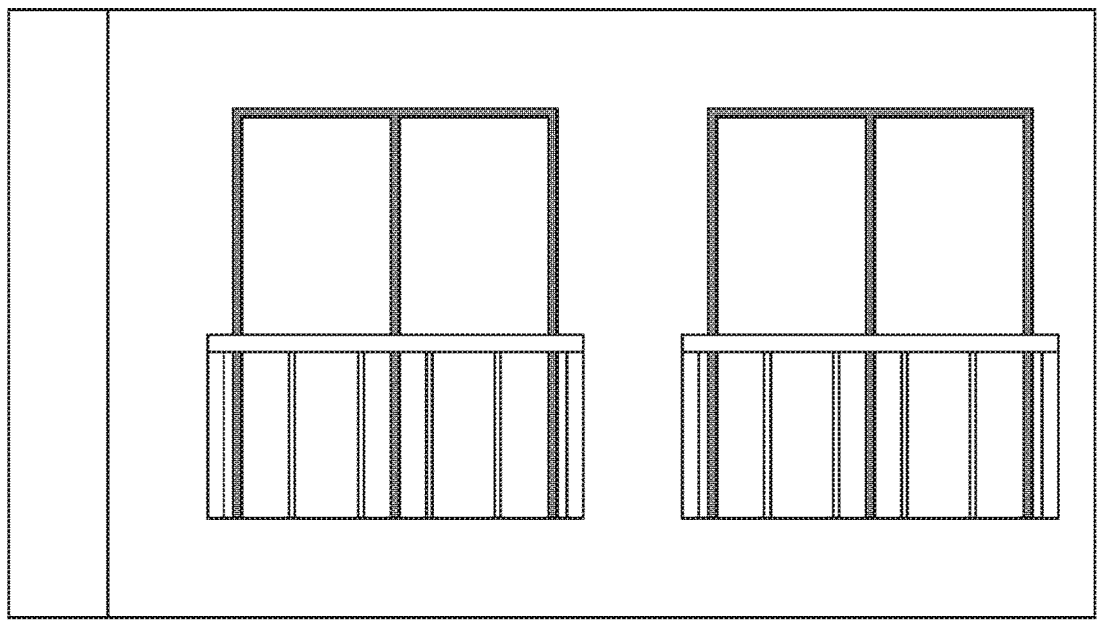
FIG. 8(a) is a diagram illustrating an example of a taken camera image and FIG. 8(b) is a diagram illustrating an example of a restricted camera image.
Figure 8:
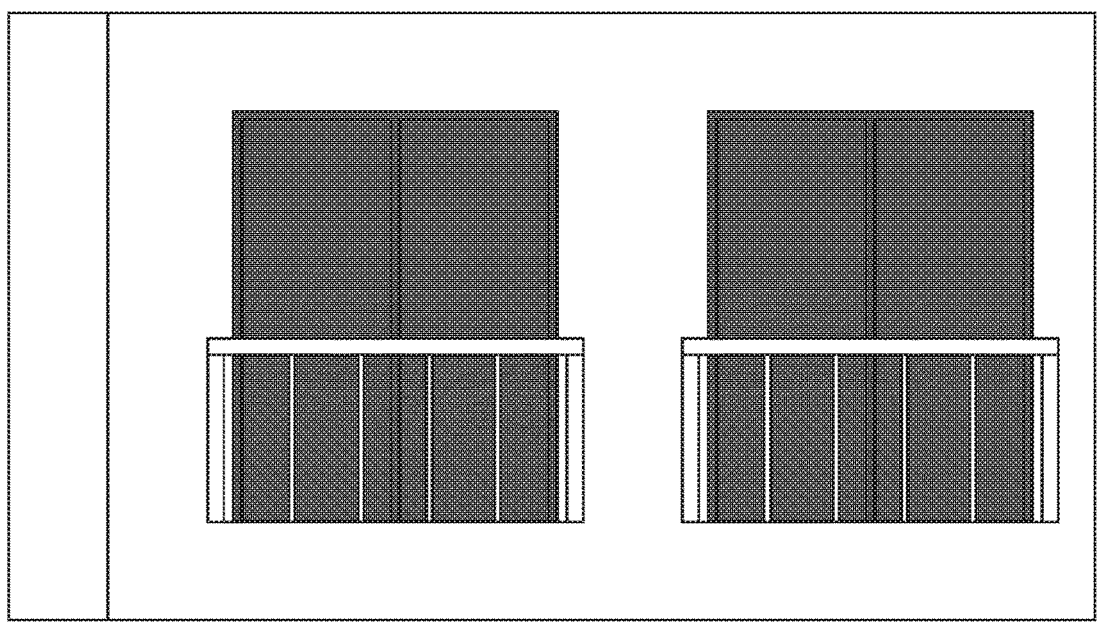

FIG. 8(a) illustrates an example of a camera image acquired by the unmanned flying body 1. This camera image contains two window frames.

The decision block 132 has an image recognition function to determine whether or not a predetermined subject is included in a camera image. One example of the predetermined subject is a window frame of a building. Normally, since a building window frame is rectangular in shape, the decision block 132 detects a rectangular frame on the outside of a building so as to determine whether the camera image includes a window frame.

A camera image is added with the positional information and image-taking direction at the time of image acquisition as metadata. In the image accumulating server 30, the storage apparatus 140 holds detail map information and building information in the map, so that the decision block 132 can determine from the positional information and image-taking direction of a camera image whether or not a subject is a building. If the subject is found to be a building and the subject includes a rectangular subject, then the decision block 132 determines that the camera image includes a window frame.

At this moment, the restriction block 130 restricts the image recording block 126 from recording a camera image to the storage apparatus 140. The restriction block 130 may disable the recording of the camera image to the storage apparatus 140 but may also disable the recording of the window frame portion in a camera image. The restriction block 130 converts the window frame portion included in a camera image into another image by image processing and the image recording block 126 records the camera image with the window frame portion converted to the storage apparatus 140.

FIG. 8(b) illustrates an example of a camera image with the window frame portion image-processed. This camera image is black-out processed in the window frame portion; however, it is also practicable to execute another type of image processing, mosaic processing, for example, on the window frame portion.

In FIG. 5, the registration block 134 registers into the storage apparatus 140 the information regarding subjects permitted for inclusion in a camera image and/or the information regarding subjects prohibited to be included in a camera image. The above-mentioned window frame is registered in the storage apparatus 140 as one item of the information regarding the subjects that are prohibited to be included in a camera image. The decision block 132 extracts from the storage apparatus 140 the information regarding the subjects that are prohibited to be included in a camera image so as to determine whether or not a predetermined subject is included in the camera image.

In the management mode 2, it is practicable to execute the management of camera images such that only the face of a specific person is included in a camera image to exclude the face of any other persons. In this case, a usage scene, such as so-called "selfie," is assumed in which the unmanned flying body 1 flies around a specific person so as to always take images of that person, for example. At this moment, it is not desired to take images of other persons around in consideration of privacy. Therefore, the registration block 134 registers the face images of persons to be taken into the storage apparatus 140 in advance and the restriction block 130 converts the face images other than the registered face images into other images, thereby including the face image of only a specific person in a camera image.

The decision block 132 extracts the face image of a person from a camera image so as to determine through the image recognition function whether or not the face image of a person not registered is included. If the face image of an unregistered person is found included, then the restriction block 130 converts the face image of that person into another image through image processing and the image recording block 126 records the camera image with the face portion converted to the storage apparatus 140.

As described above, if a camera image includes an improper subject, the restriction block 130 restricts the recording of a camera image by the image recording block 126. Consequently, upon a reproduction request from the reproduction terminal apparatus 40, the image distribution block 128 distributes a camera image restricted in recording with respect to a predetermined subject, thereby causing no problem in privacy infringement.

It should be noted that, the above-mentioned example, the image accumulating server 30 executes the restriction of camera image recording; however, it is also practicable to solve the problem of privacy infringement by restricting the reproduction of a camera image by the reproduction terminal apparatus 40. A camera image recorded to the image accumulating server 30 is sent to the reproduction terminal apparatus 40 through the network 22.

Referring to FIG. 6, in the reproduction terminal apparatus 40, the image acquisition block 166 acquires a camera image. At this moment, the decision block 172 determines whether or not a predetermined subject is included in the camera image. As described above, a predetermined subject is a window frame mounted on a building or a face image of a user other than a registered user. If the decision block 172 determines that such a subject is included in the camera image, then the restriction block 170 restricts the reproduction of the camera image by the reproduction processing block 168. The function of the decision block 172 may be the same as the function of the decision block 132 in the image accumulating server 30 described above.

It should be noted that the registration block 174 acquires the information regarding subjects that can be included in a camera image or the information regarding subjects that are prohibited to be included in a camera image from the storage apparatus 140 in the image accumulating server 30 and registers the acquired information into a storage apparatus (not depicted). Referring to these pieces of information, the decision block 172 determines whether or not a predetermined subject is included in the camera image; if a subject that is improper for reproduction is found included in the camera image, the restriction block 170 restricts reproduction of the camera image. The restriction of camera image reproduction may disable the reproduction of the entire camera image or permit the reproduction of subject in a state in which image processing is executed with the subject converted into another image.

<Management Mode 3>

In a management mode 3, if an image-taking range of camera 10 includes a preset image-taking prohibited area, the restriction block 130 of the image accumulating server 30 restricts the recording of a camera image by the image recording block 126 and/or the restriction block 170 of the reproduction terminal apparatus 40 restricts the reproduction of the camera image by the reproduction processing block 168.

As described above, a camera image acquired by the unmanned flying body 1 is sent to the image accumulating server 30 through the network 22 to be acquired by the image acquisition block 124. At this moment, the decision block 132 determines whether or not an image-taking prohibited area is included in the image-taking range of the camera.

The image-taking prohibited area is indicative of an area that is prohibited to be included in a camera image and the registration block 134 registers the image-taking prohibited area into the storage apparatus 140. This image-taking prohibited area may be set with a two-dimensional coordinate on the ground surface or may be set with a three-dimensional coordinate that includes the information regarding the altitudes of structures. For example, since it is desirable to prohibit the image-taking around self-defense force bases or government dignitary residences in consideration of national security and national interests, the registration block 134 registers the position coordinates of such areas into the storage apparatus 140 as image-taking prohibited areas.

The image-taking prohibited areas may be permanently set in consideration of national interests or in another point of view. As the aerial image taking with the unmanned flying body 1 gets popular, it is possible that some people do not want to have their own lands image-taken or situations occur in which image taking need be prohibited on a temporary basis with respect to a particular area such as outdoor concert venue. Therefore, the registration block 134 may register the position coordinates of image-taking prohibited areas into the storage apparatus 140 from various points of view.

Figure 9:
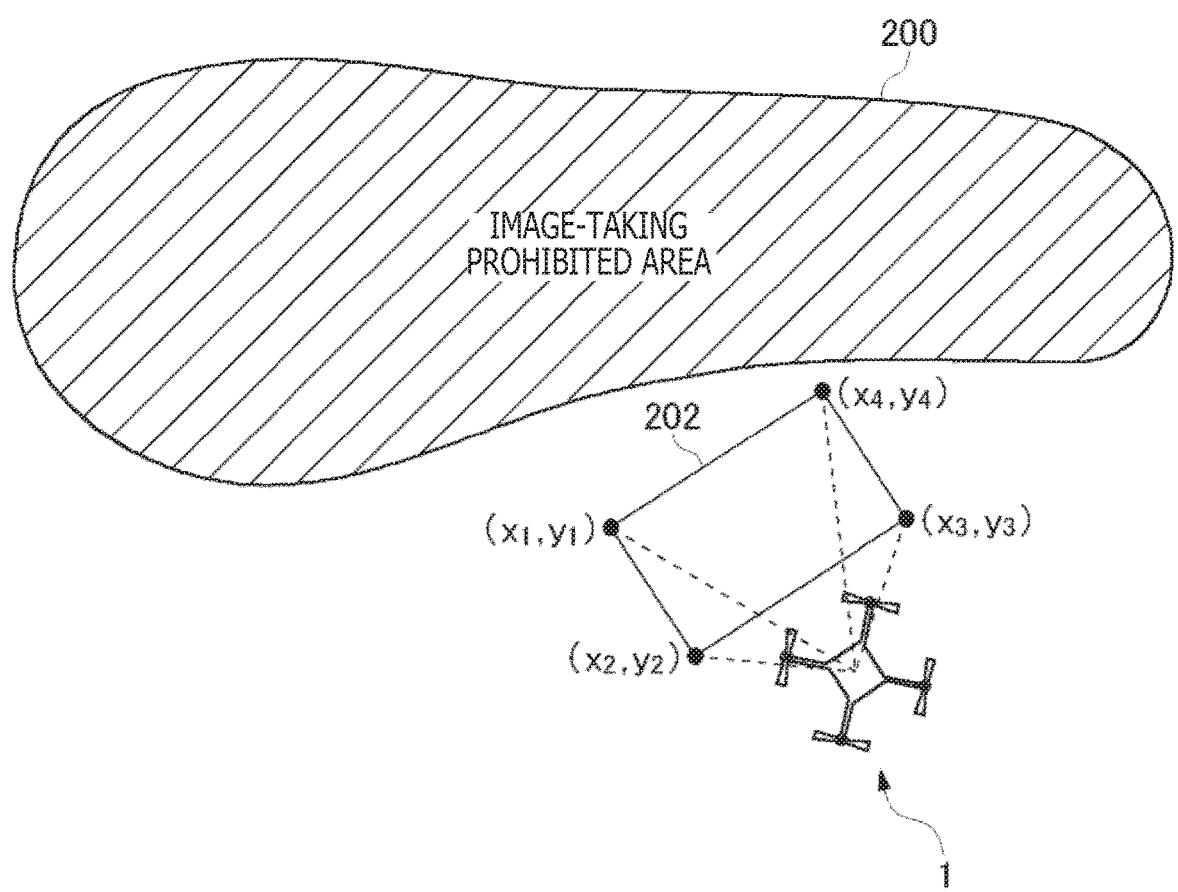
FIG. 9 is a diagram illustrating a relation between an image-taking range of a camera and an image-taking prohibited area.

FIG. 9 is a diagram illustrating the relation between an image-taking range 202 of the camera 10 and an image-taking prohibited area 200. In FIG. 9 is indicative of a situation viewed from higher than the unmanned flying body 1 in flight. In the storage apparatus 140, the image-taking prohibited area 200 is set as the information of latitude and longitude that are indicative of a two-dimensional coordinate.

The decision block 132 has a function of identifying the image-taking range 202 of the camera. A camera image is added with the positional information and image-taking direction at the time of image acquisition as metadata. The decision block 132 identifies the latitude, longitude, and altitude at the time of the acquisition of a camera image from the positional information, thereby identifying the image-taking range 202 on the ground from image-taking direction. The image-taking range 202 forms a rectangular region in which (latitude, longitude) of the four corners of the image-taking range 202 are individually defined as (x1, y1), (x2, y2), (x3, y3), and (x4, y4).

The decision block 132 determines whether or not at least a part of the image-taking prohibited area 200 is included in this rectangular region. If the image-taking prohibited area 200 is found not included in the rectangular region, the restriction block 130 does not restrict the recording of the camera image.

On the other hand, if the decision block 132 determines that the image-taking prohibited area 200 is included in the image-taking range 202 of the camera 10, then the recording of the camera image by the image recording block 126 restricted by the restriction block 130. At this moment, as described in the case of the management mode 2, the restriction block 130 may restrict the recording of the entire camera image or the recording of only a duplicate portion. The duplicate portion is indicative of the image-taken region of the image-taking prohibited area 200 and the restriction block 130 may convert the image of such a duplicate portion into another image by mosaic processing or the like, thereby restricting the recording of the camera image.

It should be noted that, as described in the case of the management mode 2, the reproduction terminal apparatus 40 may restrict the reproduction of a camera image also in the management mode 3. The camera image recorded in the image accumulating server 30 is sent to the reproduction terminal apparatus 40 through the network 22.

In FIG. 6, the image acquisition block 166 acquires a camera image in the reproduction terminal apparatus 40. At this moment, the decision block 172 determines whether or not an image-taking prohibited area is included in an image-taking range of the camera. If the decision block 172 determines that an image-taking prohibited area is included in an image-taking range of the camera, the restriction block 170 restricts the reproduction of the camera image by the reproduction processing block 168. The function of the decision block 172 may be the same as the above-mentioned function of the decision block 132 in the image accumulating server 30.

It should be noted that the registration block 174 acquires the information related with the image-taking prohibited area from the storage apparatus 140 in the image accumulating server 30 and registers the acquired information into a storage apparatus (not depicted). Referring to this information, the decision block 172 determines whether or not the image-taking prohibited area is included in the image-taking range of the camera; if the image-taking prohibited area is found included, then the restriction block 170 restricts the reproduction of the camera image. The restriction of the reproduction of the camera image may prohibit the reproduction of the entire camera image or permit the reproduction of the image of the image-taking prohibited area by executing image processing for converting this image into another image.

Thus, the present invention has been described on the basis of embodiments. The embodiments are illustrative only and therefore it is understood by those skilled in the art that there may be variations to the components and processing processes of the embodiments and these variations are within the range of the present invention.

In one variation, the image management system 100 does not have the image accumulating server 30 and the unmanned flying body 1 has a function of recording a camera image. The unmanned flying body 1 records a camera image to a storage apparatus such as an SD card or the like. The user connects a camera data port installed on the unmanned flying body 1 to the reproduction terminal apparatus 40 with a USB cable so as for the reproduction terminal apparatus 40 to download and reproduce the recorded camera image.

Figure 10:
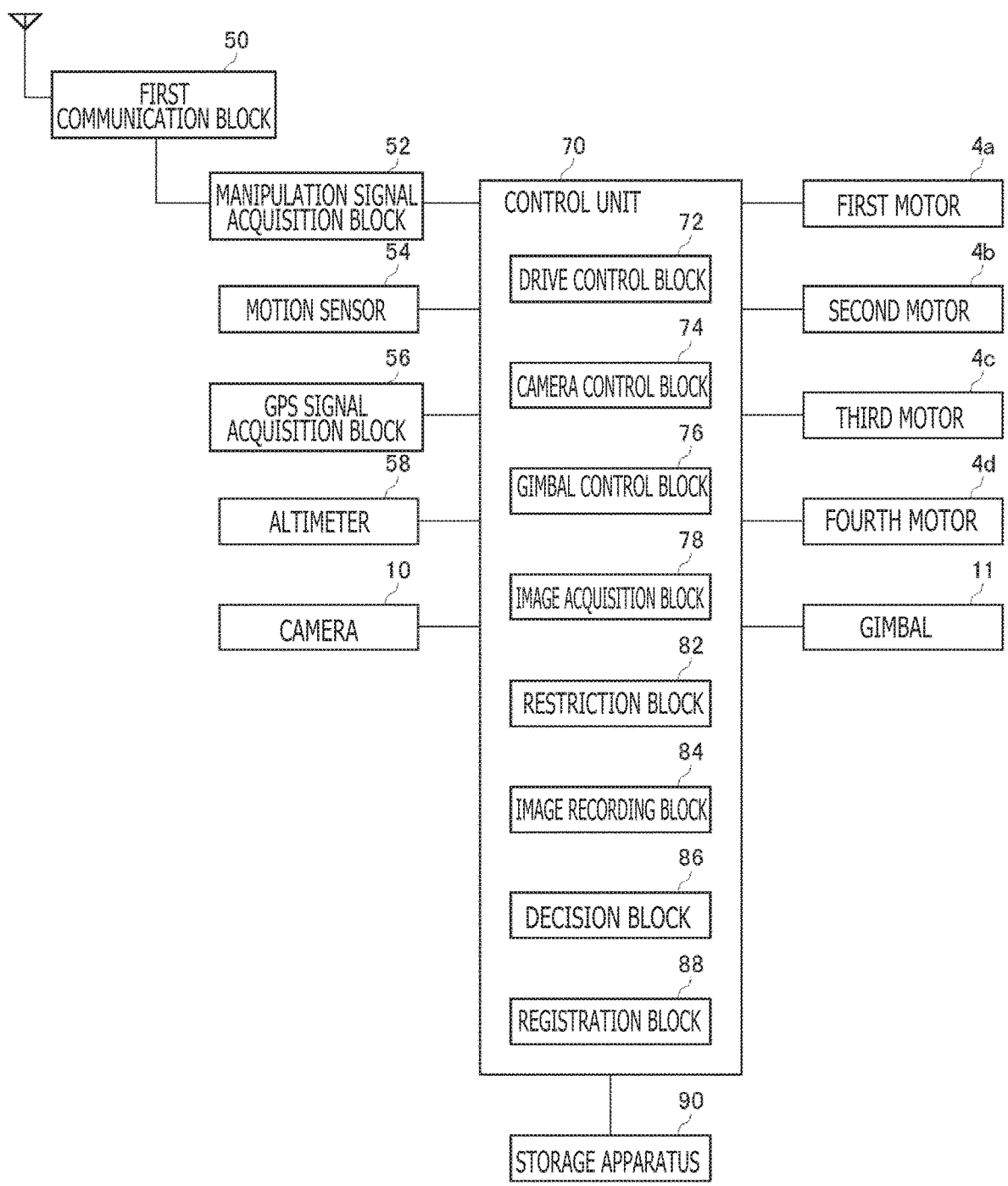
FIG. 10 is a diagram illustrating functional blocks of an unmanned flying body of a variation example.

FIG. 10 illustrates functional blocks of an unmanned flying body 1 practiced as a variation. Comparison with the functional blocks of the embodiment illustrated in FIG. 3 indicates that the unmanned flying body 1 of a variation newly includes an image recording block 84, a decision block 86, a registration block 88, and a storage apparatus 90, while the second communication block 60 and the image send block 80 of the embodiment are eliminated because the function of sending a camera image is required no more. The components having the numerals that are common between FIG. 3 and FIG. 10 have the identical functions and operate in identical manner, so that the description thereof is skipped.

The image recording block 84 records the camera image acquired by the image acquisition block 78 to the storage apparatus 90. The registration block 88 registers to the storage apparatus 90 the information of subjects that can be included in a camera image or the information of subjects that are prohibited to be included in a camera image as described in the case of the management mode 2 and the information related with image-taking prohibited areas as described in the case of the management mode 3.

With respect to the management mode 2, the decision block 86 has an image recognition function. When the image acquisition block 78 acquires a camera image, then the decision block 86 determines whether or not a predetermined subject is included in the camera image acquired by the image acquisition block 78. Predetermined subjects include a window frame mounted on a building, a face image of a user other than a registered user, and so on. If the decision block 86 determines that such a subject is included in the camera image, then the restriction block 82 restricts the recording of the camera image to the storage apparatus 90 by the image recording block 84. This recording restriction may prohibit the recording of the entire camera image or permit the reproduction of the image of the image-taking prohibited area by executing image processing for converting this image into another image.

With respect to the management mode 3, the decision block 86 has a function of identifying the image-taking range 202 of a camera. A camera image is added with the positional information and image-taking direction at the time of image acquisition as metadata. The decision block 86 identifies the latitude, longitude, and altitude at the time of the acquisition of a camera image from the positional information, thereby identifying the image-taking range 202 on the ground from the image-taking direction.

The decision block 86 determines whether or not at least a part of the image-taking prohibited area 200 is included in such a rectangular region. If the image-taking prohibited area 200 is found not included in the rectangular region, then the restriction block 82 does not restrict the recording of a camera image.

On the other hand, if the decision block 86 determines that the image-taking prohibited area 200 is included in the image-taking range 202 of the camera 10, then restriction block 82 restricts the recording of the camera image by the image recording block 84. At this moment, the restriction block 82 may restrict the recording of the entire camera image or the recording of a camera image by converting the image of the image-taken image-taking prohibited area 200 into another image by mosaic processing or the like.

It should be noted that, with respect to the management mode 3, since the drive control block 72 realtime identifies the current positional information of image-taking direction of the airframe, the decision block 86 can identify the image-taking range 202 on the ground on the basis of the current positional information and image-taking direction without referencing the metadata of the camera image. Therefore, if the decision block 86 determines that the image-taking prohibited area 200 is found included in the image-taking range 202 of camera 10, then the restriction block 82 may restrict the acquisition of the camera image by the image acquisition block 78.

REFERENCE SIGNS LIST

1 . . . Unmanned flying body, 4 . . . Motor, 5 . . . Rotor, 5a . . . First rotor, 5b . . . Second rotor, 5c . . . Third rotor, 5d . . . Fourth rotor, 10 . . . Camera, 11 . . . Gimbal, 20 . . . Remote control, 21 . . . Wireless station, 22 . . . Network, 30 . . . Image accumulating server, 40 . . . Reproduction terminal apparatus, 50 . . . First communication block, 52 . . . Manipulation signal acquisition block, 54 . . . Motion sensor, 56 . . . GPS signal acquisition block, 58 . . . Altimeter, 60 . . . Second communication block, 70 . . . Control unit, 72 . . . Drive control block, 74 . . . Camera control block, 76 . . . Gimbal control block, 78 . . . Image acquisition block, 80 . . . Image send block, 82 . . . Restriction block, 84 . . . Image recording block, 86 . . . Decision block, 88 . . . Registration block, 90 . . . Storage apparatus, 100 . . . Image management system, 120 . . . Control apparatus, 122 . . . Communication block, 124 . . . Image acquisition block, 126 . . . Image recording block, 128 . . . Image distribution block, 130 . . . Restriction block, 132 . . . Decision block, 134 . . . Registration block, 140 . . . Storage apparatus, 160 . . . Control apparatus, 162 . . . Communication block, 164 . . . Reproduction request block, 166 . . . Image acquisition block, 168 . . . Reproduction processing block, 170 . . . Restriction block, 172 . . . Decision block, 174 . . . Registration block, 180 . . . Display apparatus.

INDUSTRIAL APPLICABILITY

The present invention is applicable to technological fields for managing camera images acquired by an unmanned moving body such as an unmanned flying body or the like.

The invention claimed is:

1. An image management system for managing a camera image acquired by an unmanned flying body, comprising:
   a drive control block configured to fly said unmanned flying body by controlling a drive source of said unmanned flying body;
   an image acquisition block configured to acquire a camera image while said unmanned flying body is flying;
   an image recording block configured to record the camera image acquired by said image acquisition block;
   a reproduction processing block configured to reproduce the camera image recorded by said image recording block; and
   a restriction block configured to restrict any one of the acquisition of the camera image by said image acquisition block, the recording of the camera image by said image recording block, and the reproduction of the camera image by said reproduction processing block, wherein
   said restriction block controls an elevation angle of a camera to a level smaller than a predetermined angle when said unmanned flying body is flying a predetermined altitude or below.

2. The image management system according to claim 1, wherein
   said restriction block controls the elevation angle of the camera so as to restore an original preset elevation angle if an airframe altitude of said unmanned flying body gets higher than the predetermined altitude.

3. The image management system according to claim 1, further comprising:
   a decision block configured to determine whether or not a predetermined subject is included in a camera image, wherein
   said restricting block restricts any one of the acquisition of the camera image by said image acquisition block, the recording of the camera image by said image recording block, and the reproduction of the camera image by said reproduction processing block upon determination by said decision block that the predetermined subject is included in the camera image.

4. An unmanned flying body comprising:
a drive control block configured to fly an airframe by controlling a drive source;
a camera;
an image acquisition block configured to acquire a camera image during airframe flight;
an image recording block configured to record the camera image acquired by said image acquisition block; and
a restriction block configured to restrict any one of the acquisition of the camera image by said image acquisition block and the recording of the camera image by said image recording block on the basis of a camera attitude and a flight state of the airframe, wherein,
if the airframe is flying a predetermined altitude or below, then said restriction block restricts an elevation angle of the camera to a level smaller than a predetermined angle.

5. The unmanned flying body according to claim 4, wherein,
if the airframe altitude gets higher than the predetermined altitude, then said restriction block restricts the elevation angle of the camera to be restored to an original preset elevation angle.

6. The unmanned flying body according to claim 4, further comprising:
a decision block configured to determine whether or not an image-taking prohibited area is included in an image-taking range of a camera by identifying the image-taking range of the camera from a camera attitude and a flight state of the airframe, wherein
said restriction block restricts any one of the acquisition of a camera image by said image acquisition block and the recording of the camera image by said image recording block upon determination by said decision block that the image-taking prohibited area is included in the image-taking range of the camera.

* * * * *